United States Patent
Shoji

(10) Patent No.: US 10,422,426 B2
(45) Date of Patent: Sep. 24, 2019

(54) ASSEMBLY FOR REGULATING GROUND SPEED OF VEHICLE

(71) Applicant: KUBOTA CORPORATION, Osaka (JP)

(72) Inventor: Yusuke Shoji, Duluth, GA (US)

(73) Assignee: KUBOTA CORPORATION, Osaka (JP)

( * ) Notice: Subject to any disclaimer, the term of this patent is extended or adjusted under 35 U.S.C. 154(b) by 255 days.

(21) Appl. No.: 15/351,877

(22) Filed: Nov. 15, 2016

(65) Prior Publication Data

US 2018/0135748 A1 May 17, 2018

(51) Int. Cl.
| | |
|---|---|
| F16H 61/26 | (2006.01) |
| B60K 23/00 | (2006.01) |
| B60K 20/04 | (2006.01) |
| B60K 26/02 | (2006.01) |
| F16H 59/02 | (2006.01) |

(52) U.S. Cl.
CPC ............. *F16H 61/26* (2013.01); *B60K 20/04* (2013.01); *B60K 23/00* (2013.01); *B60K 26/02* (2013.01); *F16H 59/02* (2013.01); *B60Y 2200/221* (2013.01); *F16H 2059/0256* (2013.01); *F16H 2059/0295* (2013.01)

(58) Field of Classification Search
CPC .......... F16H 61/26; F16H 21/44; F16H 59/04; F16H 2059/0256; B60K 20/04; B60K 23/00; B60K 26/02; B60Y 2200/221
See application file for complete search history.

(56) References Cited

U.S. PATENT DOCUMENTS

| | | | | |
|---|---|---|---|---|
| 2,239,439 A | * | 4/1941 | Crannell | F16H 59/04 477/210 |
| 3,254,748 A | * | 6/1966 | Smirl | F16D 23/12 192/89.2 |
| 4,759,417 A | * | 7/1988 | Wanie | B60K 20/00 180/273 |
| 4,883,137 A | * | 11/1989 | Wanie | B60K 20/00 180/6.34 |
| 5,263,385 A | * | 11/1993 | Hirata | B60K 26/00 188/378 |
| 6,237,711 B1 | * | 5/2001 | Hunt | B60W 30/18 180/315 |
| 6,886,677 B2 | * | 5/2005 | Rupiper | F16H 59/06 180/336 |
| 2007/0000347 A1 | * | 1/2007 | Keown | G05G 1/30 74/560 |
| 2008/0053736 A1 | * | 3/2008 | Yasuda | B60K 7/0015 180/291 |
| 2011/0167951 A1 | * | 7/2011 | Thiel | G05G 1/44 74/512 |

* cited by examiner

*Primary Examiner* — Zakaria Elahmadi
(74) *Attorney, Agent, or Firm* — Greenblum & Bernstein, P.L.C.

(57) ABSTRACT

An assembly for regulating ground speed of a vehicle includes a shift arm fixed to the transmission shaft, a main shaft, a control arm connected to the main shaft, a shift rod transmitting pivotal movement of the control arm to the shift arm, a first pedal unit acting as a seesaw pedal unit, and a second pedal unit acting as a dual pedal system, and a common lever element transmitting pivotal movement caused by the first pedal unit or the second pedal unit to the control arm. The first pedal unit and the second pedal unit are replaceable with each other.

8 Claims, 9 Drawing Sheets

ASSEMBLY FOR REGULATING GROUND SPEED OF VEHICLE

TECHNICAL FIELD

The disclosure relates to an assembly for regulating ground speed of a vehicle, in which the vehicle includes a variable speed transmission having a transmission shaft rotatable in one direction from a neutral position to move the vehicle forward and rotatable in the other direction from the neutral position to move the vehicle backward.

BACKGROUND

Vehicles such as lawn mowers or off-road vehicles are equipped with a variable speed transmission for supplying engine power to driving wheels. Adjusting a shift position of the variable speed transmission varies the ground speed of the vehicle. In many cases, the shift position of the variable speed transmission is adjusted by a pedal system mounted on a vehicle floor. Typical examples of the pedal system are a seesaw pedal system and a dual pedal system.

An example of the seesaw pedal system disclosed in U.S. Pat. No. 5,263,385 includes a boss rotatable about an axis extending in a vehicle transverse direction, a front arm extending forward from one end of the boss, and a rear arm extending rearward from the other end of the boss. A further arm extends from the boss to be connected to a shift arm fixed to a transmission shaft of a variable transmission via a linkage. The front arm has a front depression surface, and the rear arm has a rear depression surface. While pressing down on the front depression surface increases forward-drive speed of the vehicle, pressing down on the rear depression surface increases reverse-drive speed of the vehicle. The front depression surface and the rear depression surface are spaced apart from each other in a vehicle front-rear direction.

An example of the dual pedal system disclosed in U.S. Pat. No. 6,237,711 includes a forward-drive pedal fixed to a forward-drive pedal shaft, and a reverse-drive pedal fixed to a reverse-drive pedal shaft, in which the forward-drive pedal and the reverse-drive pedal are arranged side by side in a vehicle transverse direction. The forward-drive pedal shaft and the reverse-drive pedal shaft are connected to a shift arm fixed to a transmission shaft of a variable speed transmission through a linkage.

The seesaw pedal system is simpler than the dual pedal system in construction, and thus is advantageous in terms of manufacturing cost. On the other hand, the dual pedal system is more complicated than the seesaw pedal system in construction, but is advantageous in that the sensations brought to the operator when depressing the forward-drive pedal and when depressing the reverse-drive pedal are substantially the same.

SUMMARY

Since each of the seesaw pedal system and the dual pedal system has its own characteristic features, different users would like to use different pedal systems. Thus, there has been a demand for an assembly for regulating vehicle ground speed that can easily achieve either the seesaw pedal system or the dual pedal system depending on the user's demand.

An assembly for regulating ground speed of a vehicle disclosed herein satisfies the above demand. The vehicle to be loaded with the assembly includes an engine, and a variable speed transmission having a transmission shaft changing engine power and supplying the power to driving wheels to rotate in one direction from a neutral position to move the vehicle forward and to rotate in the other direction from the neutral position to move the vehicle backward. The assembly includes a shift arm fixed to the transmission shaft, a main shaft extending in a vehicle transverse direction, a support bracket supporting the main shaft, a control arm connected to the main shaft, a shift rod transmitting pivotal movement of the control arm to the shift arm, a first pedal unit acting as a seesaw pedal system, and a second pedal unit acting as a dual pedal system, the first pedal unit and the second pedal unit being replaceable with each other, and a common lever element transmitting pivotal movement caused by the first pedal unit or the second pedal unit to the control arm.

This arrangement provides fundamental components of the pedal system including the shift arm, the main shaft, the support bracket, the control arm, and the shift rod. Thus, when the seesaw pedal system is required, first pedal unit components, which convert the depressing operation caused by the operator to rotating movement of the main shaft, are simply assembled to the fundamental components. In one or more embodiments, the first pedal unit components include a seesaw pedal arm unit having a front arm and a rear arm, a first auxiliary shaft pivotably supporting the seesaw pedal arm unit, and a pedal rod transmitting pivotal movement of the seesaw pedal arm unit to the common lever device. Combining the fundamental components of the pedal system with the first pedal unit components achieves the seesaw pedal system including the seesaw pedal arm unit.

On the other hand, when the dual pedal system is required, second pedal unit components, which convert the depressing operation caused by the operator to rotating movement of the main shaft, are simply assembled to the fundamental components. In one or more embodiments, the second pedal unit components include a front pedal arm connected to the common lever element, an additional lever element rotatably supported by the main shaft, a rear pedal arm connected to the additional lever element, and a reverse linkage reversing rotation of the additional lever element to transmit the rotation to the common lever element. Combining the fundamental components of the pedal system with the second pedal unit components achieves the dual pedal system including the front pedal arm and the rear pedal arm.

The assembly disclosed herein uses the fundamental components in any case regardless of providing the seesaw pedal system or the dual pedal system. In other words, the user can easily achieve the seesaw pedal system or the dual pedal system by simply selecting the first pedal unit components or the second pedal unit components.

To assist the operator in performing the forward-drive operation or the reverse-drive operation, each of the first pedal unit achieving the seesaw pedal system and the second pedal unit achieving the dual pedal system includes a forward-drive depression surface and a reverse-drive depression surface spaced apart from each other in a vehicle front-rear direction. In the first pedal unit, the forward-drive depression surface is formed at a free end of the front arm, and the reverse-drive depression surface is formed at a free end of the rear arm. In the second pedal unit, the forward-drive depression surface is formed at a free end of the front pedal arm, and the reverse-drive depression surface is formed at a free end of the rear pedal arm.

DETAILED DESCRIPTION

Figure 1:
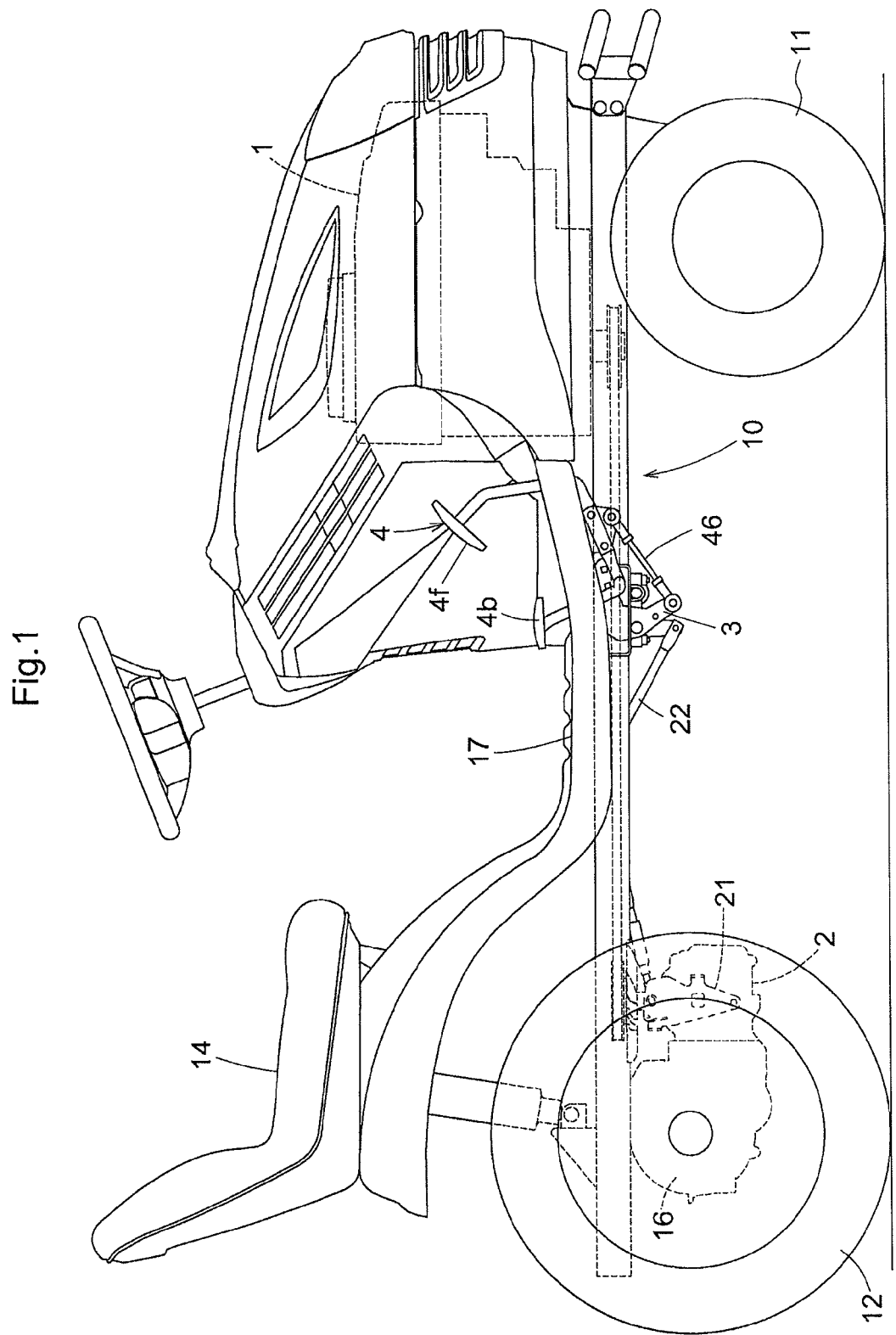
FIG. 1 is a side view of a tractor equipped with a pedal system for regulating ground speed of a vehicle.

FIG. 1 shows a tractor that can be equipped with either one of a seesaw pedal system and a dual pedal system as a pedal system for regulating vehicle ground speed. The tractor includes a vehicle body 10, an engine 1 mounted forward of the vehicle body 10, a pair of right and left steerable front wheels 11, and a ride-on driver's section 15 provided rearward of the vehicle body 10. The driver's section 15 includes a steering wheel 13 linked to the right and front wheels 11 and a driver's seat 14, for example. The vehicle body 10 further includes a pair of right and left driving rear wheels 12 mounted lateral outward of the driver's section 15 and driven by drive power from the engine 1, and a floor panel 17 on which the driver's section is provided. Under the driver's section 15 are mounted a transmission case 16 housing speed change gears (not shown) acting as an auxiliary transmission, for example, and a variable speed transmission 2 acting as a primary transmission. The variable speed transmission 2 changes the engine power and transmits the power to the rear wheels 12.

Figure 4:
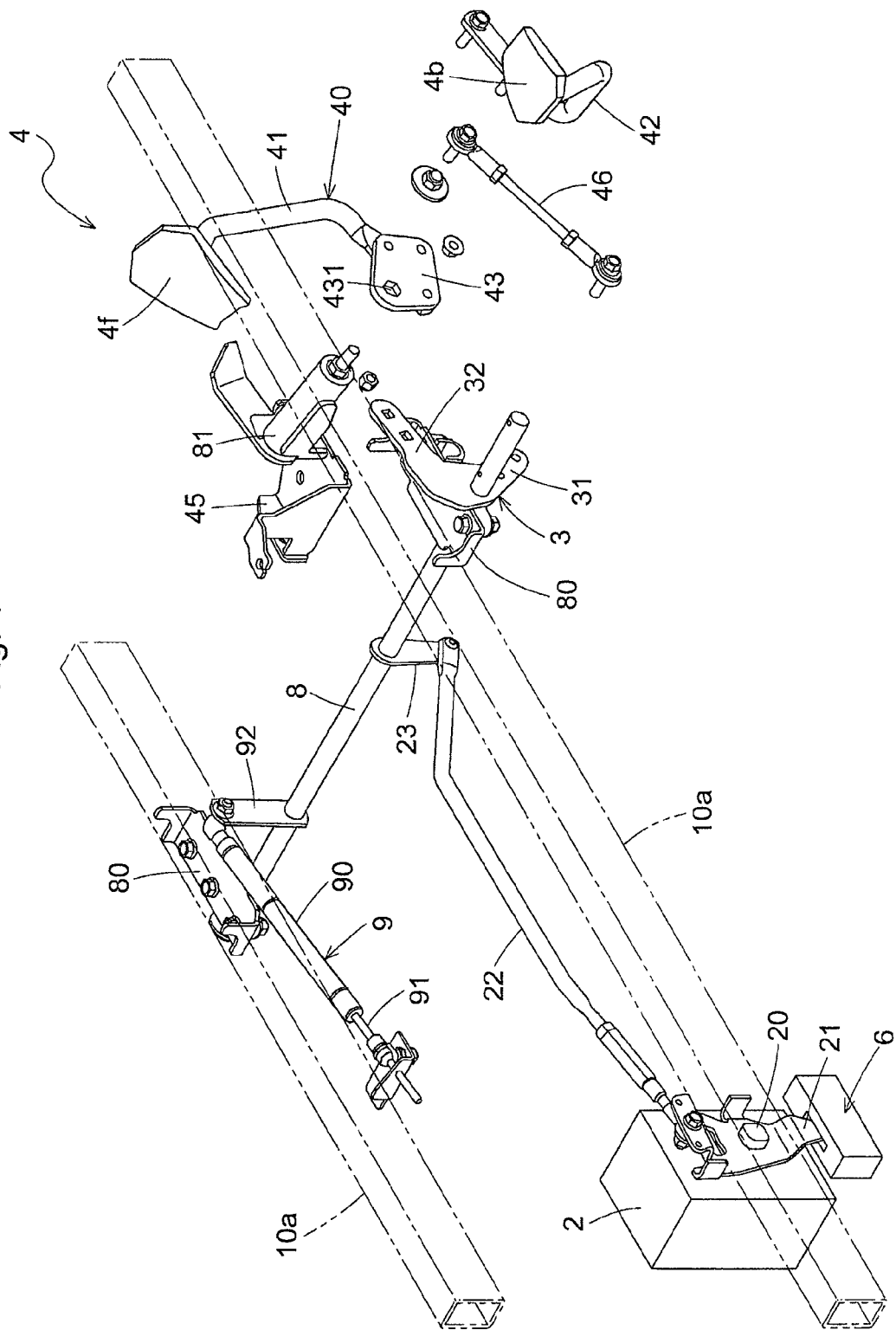
FIG. 4 is an exploded perspective view of fundamental component of the pedal system.

In one or more embodiments, the variable speed transmission 2 is formed as a hydrostatic transmission (HST) including a transmission shaft 20 referred to as a "trunnion shaft" connected to a swash plate of a hydraulic pump. The transmission shaft 20 is rotated to vary an angle of the swash plate between a maximum forward-rotation position and a maximum reverse-rotation position across a neutral position. More particularly, the transmission shaft 20 is rotated in one direction from the neutral position to move the vehicle forward and is rotated in the other direction from the neutral position to move the vehicle backward. Referring to FIG. 4, the assembly further includes a neutral urging mechanism 6, which is schematically shown, mounted adjacent to the variable speed transmission 2. The neutral urging mechanism 6 is well known per se, and uses a spring force or hydraulic pressure as a neutral urging force applied on the transmission shaft 20. This allows the transmission shaft 20 to return to the neutral position after having rotated in either direction from the neutral position.

Figure 2:
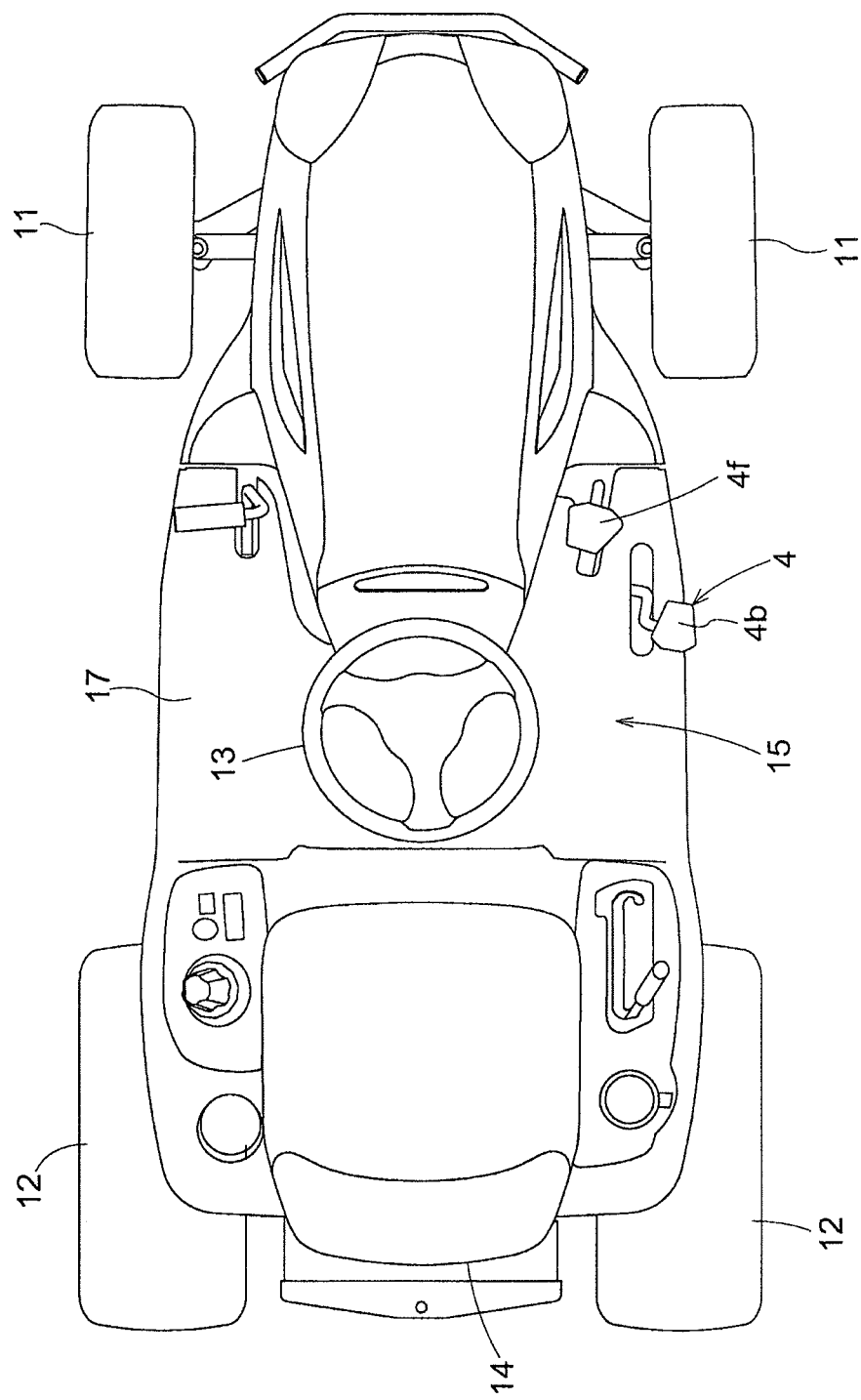
FIG. 2 is a top plan view of the tractor equipped with a seesaw pedal system.
Figure 3:
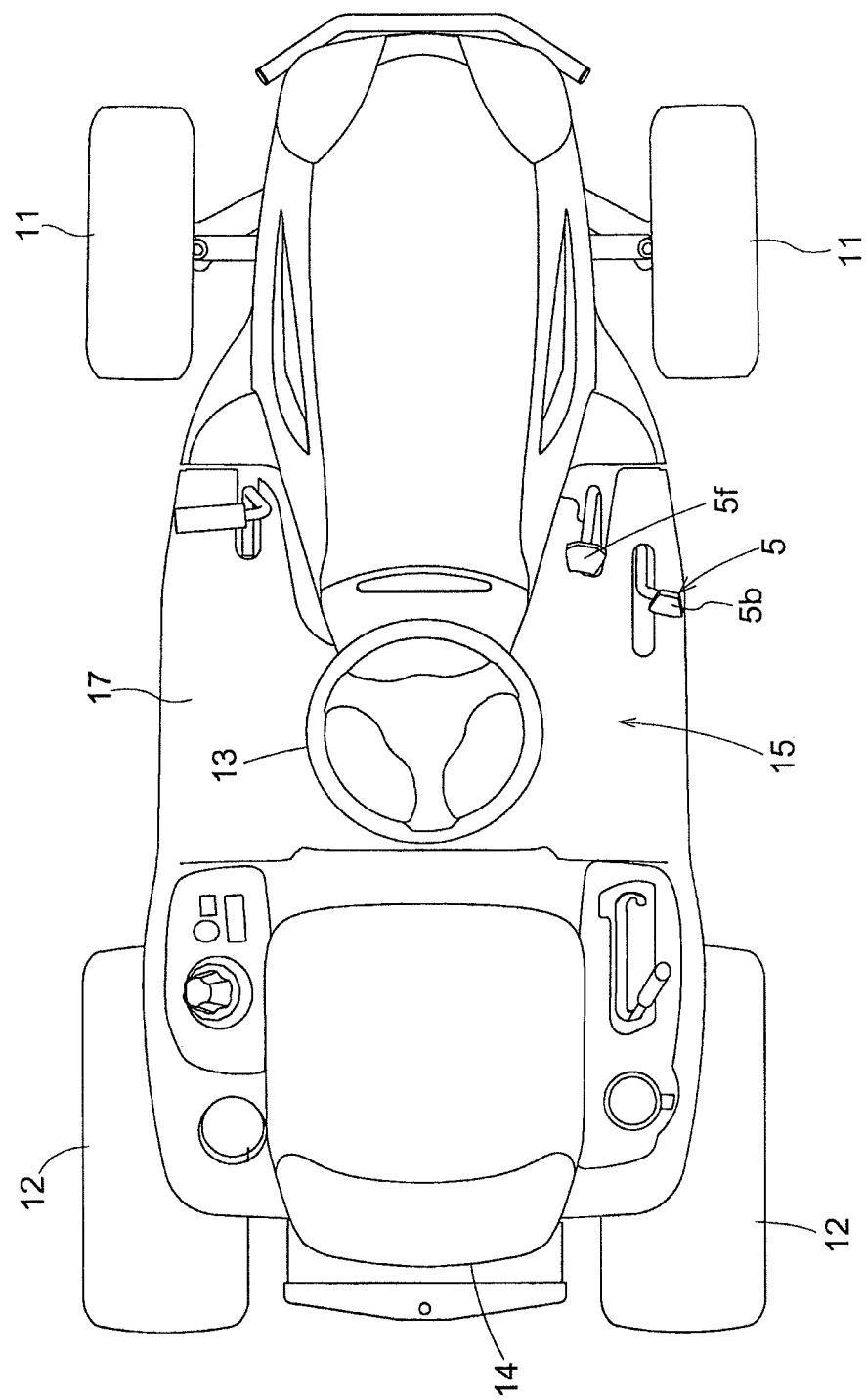
FIG. 3 is a top plan view of the tractor equipped with a dual pedal system.

Referring to FIG. 2, the vehicle body 10 includes a first pedal unit 4, which represents the seesaw pedal system, having two elements projecting from the floor panel 17. One of the two elements of the first pedal unit 4 has a forward-drive depression surface 4f at a distal end (free end) thereof, and the other of the two elements of the first pedal unit 4 has a reverse-drive depression surface 4b at a distal end (free end) thereof. Referring to FIG. 3, the vehicle body 10 includes a second pedal unit 5, which represents the dual pedal system, having two elements projecting from the floor panel 17. One of the two elements of the second pedal unit 5 has a forward-drive depression surface 5f at a distal end (free end) thereof, and the other of the two elements of the second pedal unit 5 has a reverse-drive depression surface 5b at a distal end (free end) thereof. FIGS. 2 and 3 show the postures of the first pedal unit 4 and the second pedal unit 5 with the variable speed transmission 2 being in the neutral position. As apparent from FIGS. 2 and 3, the forward-drive depression surface 4f and the reverse-drive depression surface 4b of the first pedal unit 4 are spaced apart from each other in a vehicle front-rear direction and a vehicle transverse direction. Likewise, the forward-drive depression surface 5f and the reverse-drive depression surface 5b of the second pedal unit 5 are spaced apart from each other in the vehicle front-rear direction and the vehicle transverse direction. A distance between the forward-drive depression surface 5f and the reverse-drive depression surface 5b of the second pedal unit 5 in the vehicle front-rear direction is smaller than a distance between the forward-drive depression surface 4f and the reverse-drive depression surface 4b of the first pedal unit 4 in the vehicle front-rear direction.

Next, fundamental components of the pedal system forming an assembly for regulating vehicle ground speed will be described in reference to FIG. 4. The assembly includes a shift arm 21 fixed to the transmission shaft 20 of the variable speed transmission 2, a shift rod 22 having one end connected to a free end of the shift arm 21, a main shaft 8 extending in the vehicle transverse direction in a forward position spaced apart from the variable speed transmission 2 in the vehicle front-rear direction and rotatably supported by two support brackets 80. The support brackets 80 are fixed to a pair of frame rails 10a forming the vehicle body 10. The main shaft 8 is connected to one end of a control arm 23 having the other end connected to the other end of the shift rod 22. The main shaft 8 is also connected to a common lever element 3 to be relatively unrotatable so that pivotal movement of the common lever element 3 causes rotation of the transmission shaft 20. With the first pedal unit 4 being mounted on the vehicle body, the common lever element 3 transmits pivotal movement caused by depression of the first pedal unit 4 to the main shaft 8 and eventually to the transmission shaft 20. With the second pedal unit 5 being mounted on the vehicle body, the common lever element 3 transmits pivotal movement caused by depression of the second pedal unit 5 to the main shaft 8 and eventually to the transmission shaft 20. In one or more embodiments, the fundamental components of the pedal system include the shift arm 21, the shift rod 22, the control arm 23, the main shaft 8, the support brackets 80, and the common lever element 3. The common lever element 3 is boomerang-shaped having a first lever 31 and a second lever 32.

In one or more embodiments, the assembly further includes a pedal damper 9 for adjusting a feeling of pedal operation. The pedal damper 9 acts on the main shaft 8 and includes a slide rod 91 connected to a lever 92 mounted on the main shaft 8, and a spring-action or hydraulically-operated position retaining device 90, which is commonly used per se.

Figure 5:
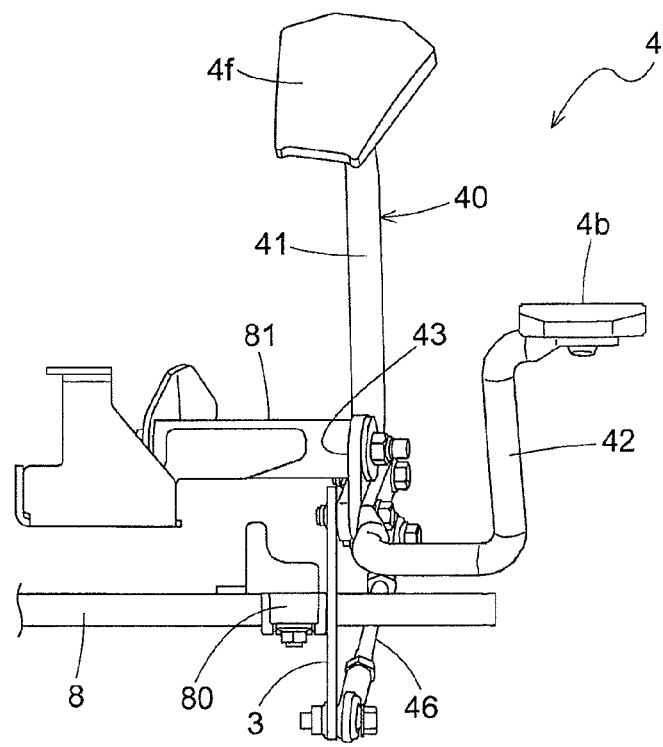
FIG. 5 is a rear view of the seesaw pedal system including a first pedal unit.
Figure 6:
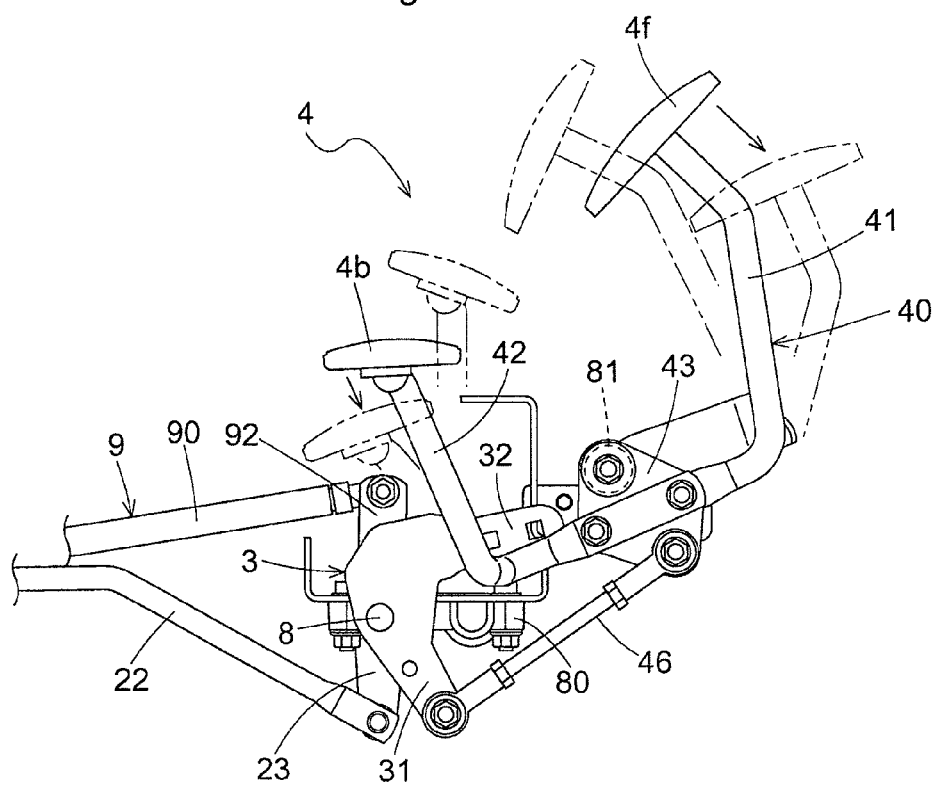
FIG. 6 is a side view of the seesaw pedal system showing transition from a neutral position to a forward-drive state or a reverse-drive state.
Figure 7:
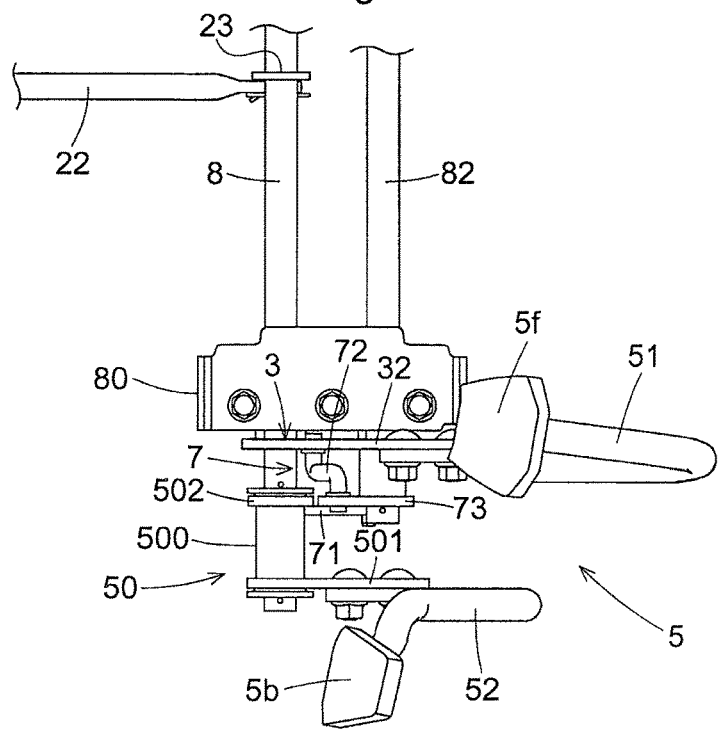
FIG. 7 is a top plan view of the dual pedal system including a second pedal unit.
Figure 8:
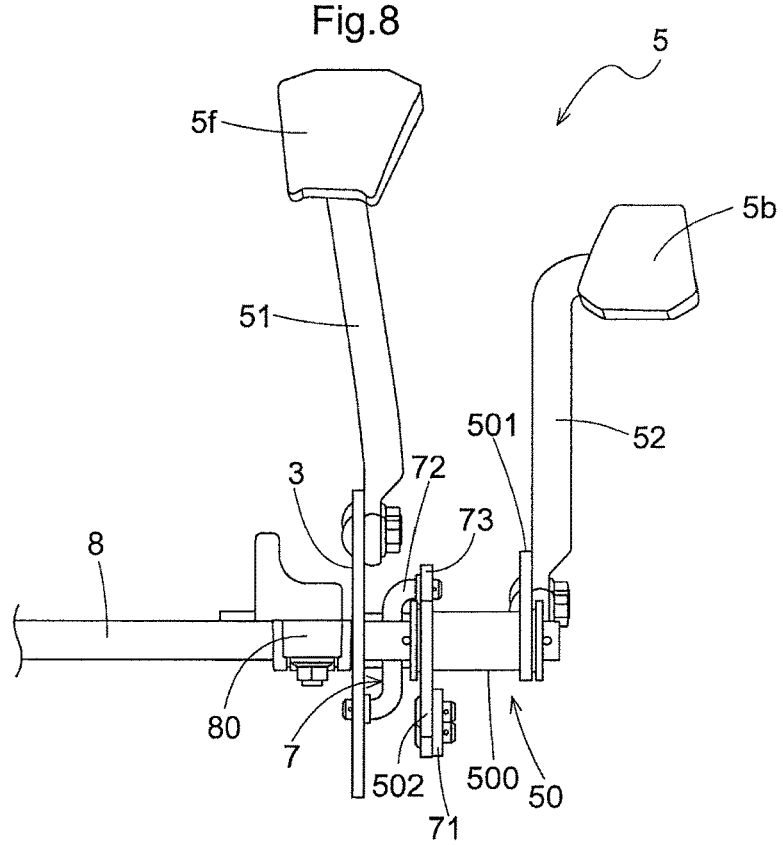
FIG. 8 is a rear view of the dual pedal system including the second pedal unit.
Figure 9:
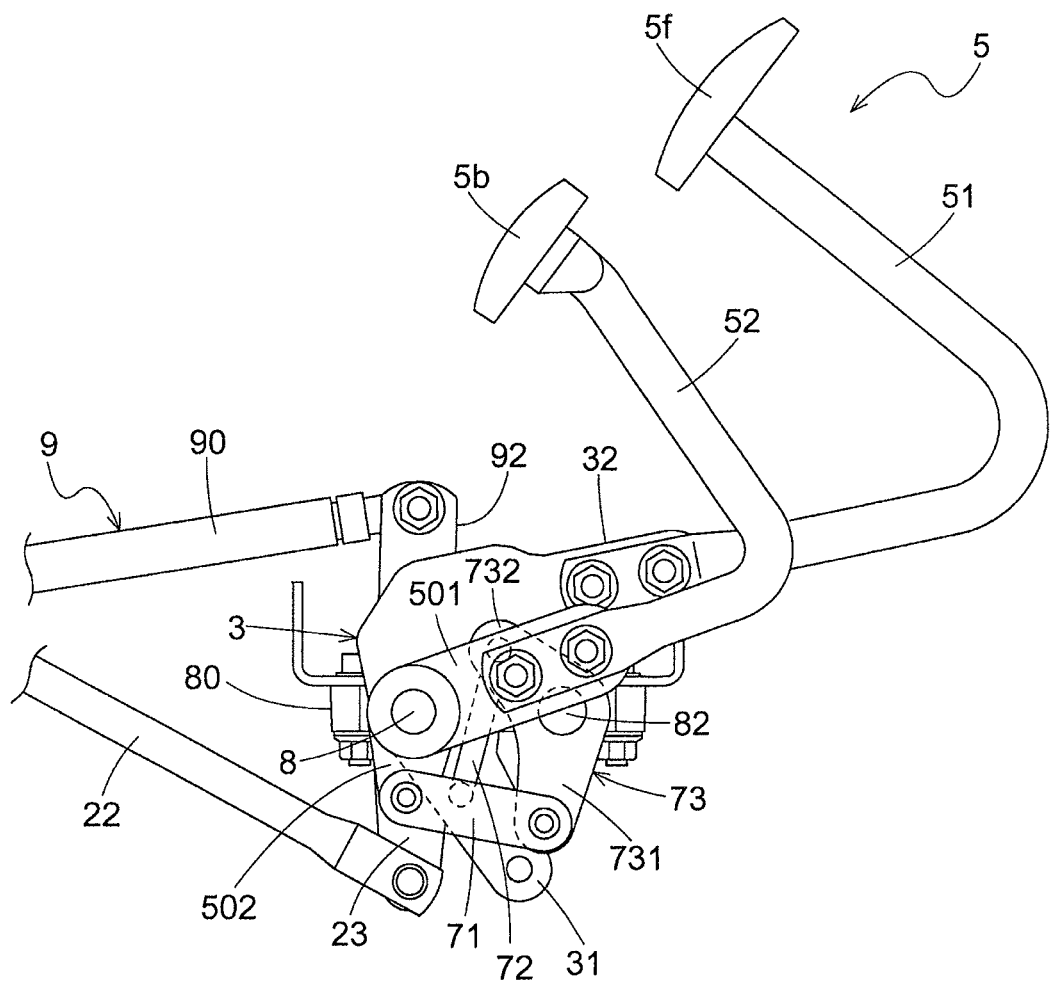
FIG. 9 is a side of the dual pedal system.

The first pedal unit 4 will be described in further detail in reference to FIGS. 5 and 6. The first pedal unit 4 includes a seesaw pedal arm unit 40, a first auxiliary shaft 81 for pivotably supporting the seesaw pedal arm unit 40, and a pedal rod 46 for transmitting pivotal movement of the seesaw pedal arm unit 40 to the common lever element 3. The first auxiliary shaft 81 is supported to the vehicle body 10 through a shaft bracket 45. The seesaw pedal arm unit 40 consists of a front arm 41, a rear arm 42, and a connecting plate 43 having a through bore. The connecting plate 43 is fitted to the first auxiliary shaft 81 via the through bore and is supported by the first auxiliary shaft 81 to be relatively rotatable. The front arm 41 and the rear arm 42 are fixed to the connecting plate 43 to form the seesaw pedal arm unit 41 that is pivotable about the first auxiliary shaft 81. The pedal rod 46 has one end connected to the connecting plate 43, and the other end connected to the first lever 31 of the common lever element 3 so that the common lever element 3, the pedal rod 46, and the seesaw pedal arm unit 40 achieve a four-joint linkage together. The forward-drive depression surface 4f is formed at a free end (distal end) of the front arm 41, and the reverse-drive depression surface 4b is formed at a free end (distal end) of the rear arm 42. With such an arrangement, as shown in FIG. 6, pressing down on the forward-drive depression surface 4f causes the transmission shaft 20 to rotate in one direction from the neutral position to move the vehicle forward, and pressing down on the reverse-drive depression surface 4b causes the transmission shaft 20 to rotate in the other direction from the neutral position to move the vehicle backward.

The second pedal unit 5 will be described in further detail in reference to FIGS. 7 to 10. The second pedal unit 5 consists of a front pedal arm 51, a rear pedal arm 52, an additional lever element 50, and a reverse linkage 7. The front pedal arm 51 is fixedly connected to the second lever 32 of the common lever element 3. The additional lever element 50 has a boss 500, a first arm 501 mounted on one end of the boss 500, and a second arm 502 mounted on the other end of the boss 500. The boss 500 is fitted on the main shaft 8 to be relatively rotatable. The rear pedal arm 502 is fixedly connected to the first arm 501 of the additional lever element 50.

Figure 10:
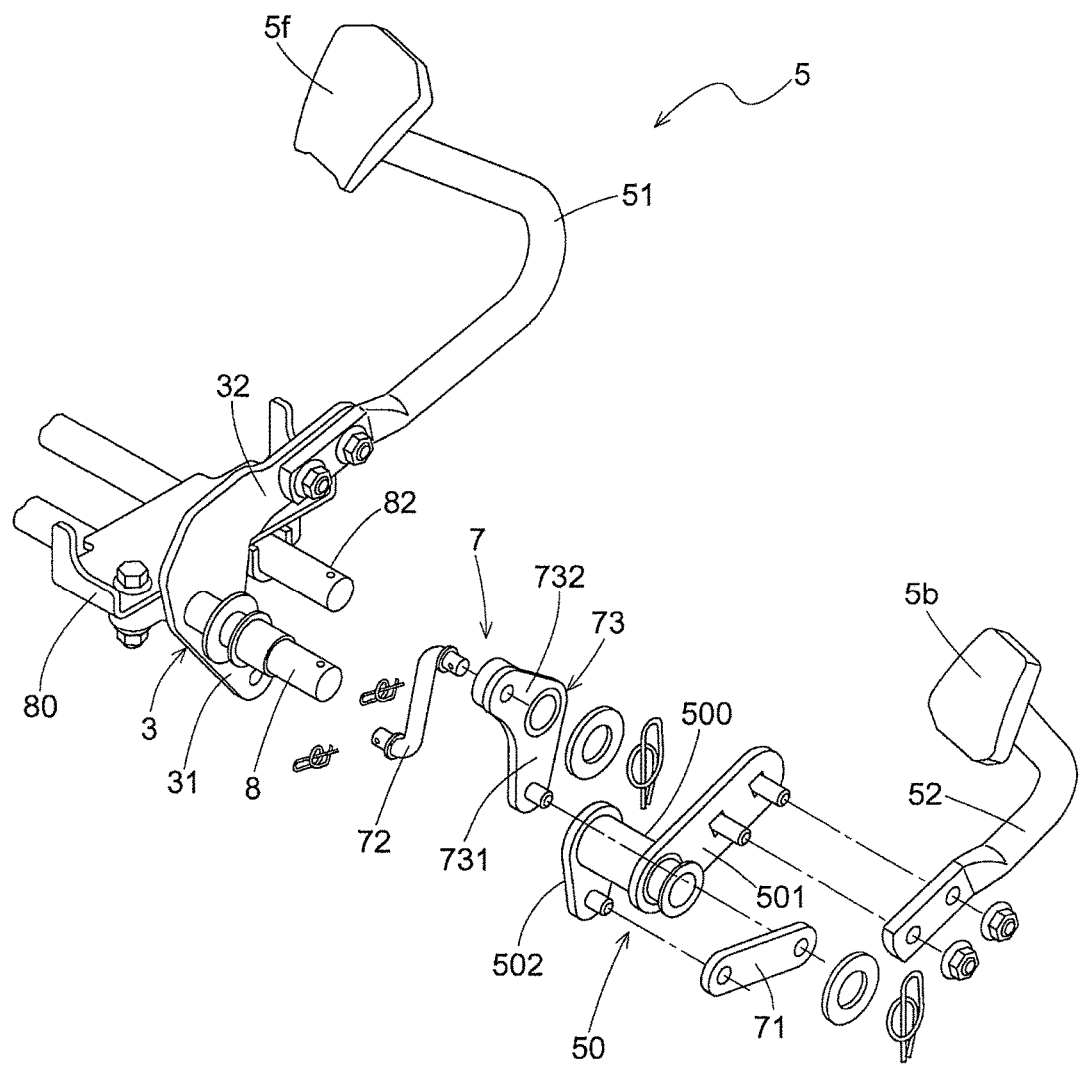
FIG. 10 is an exploded perspective view of a reverse linkage.

The reverse linkage 7 receives pivotal movement of the additional lever element 50 as input displacement and transmits pivotal movement of the common lever element 3 as output displacement. The additional lever element 50 and the common lever element 3 are pivoted in the opposite directions to each other. Referring to FIG. 10, the reverse linkage 7 includes a second auxiliary shaft 82 extending parallel to the main shaft 8 to act as a fixed shaft. The second auxiliary shaft 82 is supported by the two support brackets 80 that also support the main shaft 8. The reverse linkage 7 further includes a first link 71, a second link 72, and a link arm unit 73. The link arm unit 73 has a first arm 731 and a second arm 732, and is supported by the second auxiliary shaft 82 to be relatively rotatable. The first link 71 has one end connected to the additional lever element 50, and the other end connected to first arm 731 of the link arm unit 73. The second link 72 has one end connected to the second arm 732 of the link arm unit 73, and the other end connected to the first lever 31 of the common lever element 3.

Figure 11:
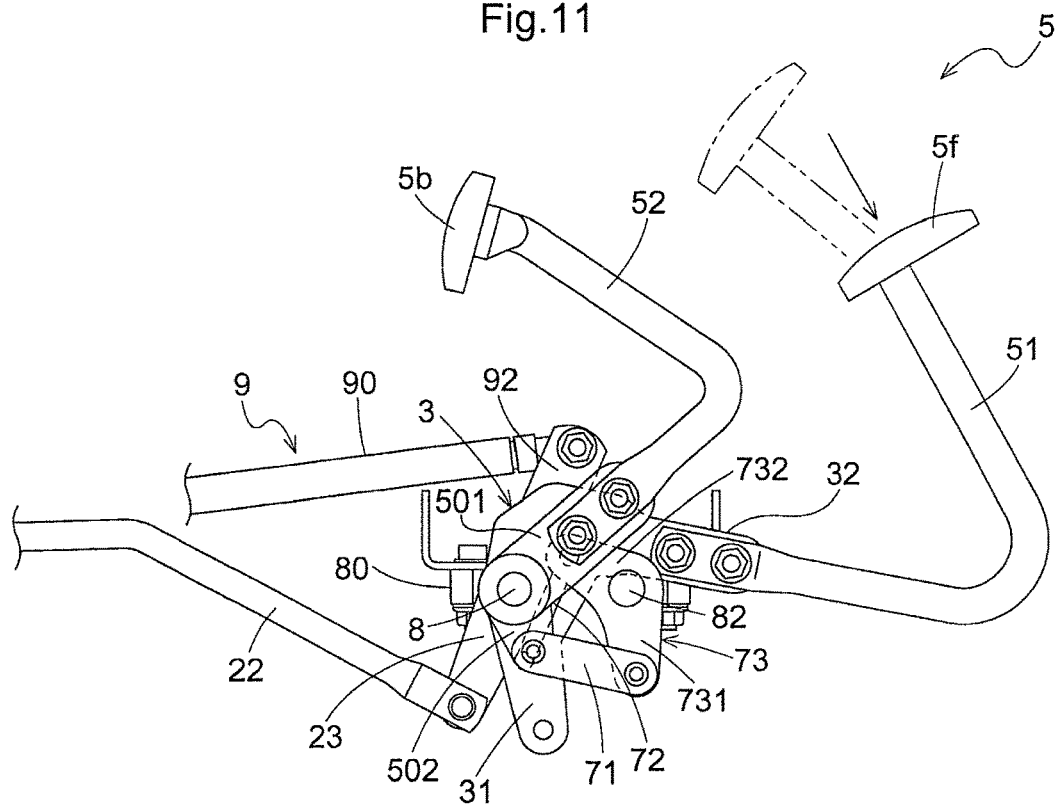
FIG. 11 a side view of the dual pedal system in the forward-drive state.
Figure 12:
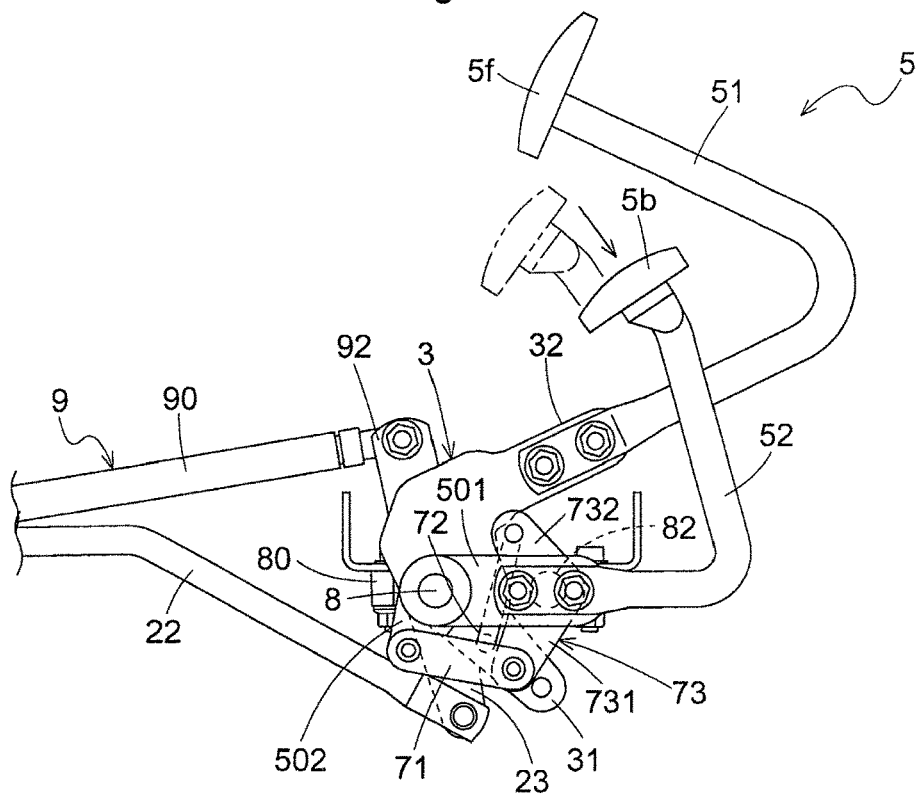
FIG. 12 is a side view of the dual pedal system in the reverse-drive state.

The forward-drive depression surface 5f is formed at a free end (distal end) of the front pedal arm 51, and the reverse-drive depression surface 5b is formed at a free end (distal end) of the rear pedal arm 52. With such an arrangement, pressing down on the forward-drive depression surface 5f causes the transmission shaft 20 to rotate in one direction from the neutral position to move the vehicle forward as shown in FIG. 11, and pressing down on the reverse-drive depression surface 5b causes the transmission shaft 20 to rotate in the other direction from the neutral position to move the vehicle backward as shown in FIG. 12.

The pedal system described above achieves the seesaw pedal system with the first pedal unit 4 being mounted the fundamental components of the pedal system, and the dual pedal system with the second pedal unit 5 being mounted on the fundamental components of the pedal system.

In the above embodiment, the first pedal unit 4 forms a seesaw structure including the front arm 41 and the rear arm 42 connected to each other via the connecting plate 43. Instead, the front arm 41 may be formed integrally with the rear arm 42 to provide a single arm element having a long plate strip. In this case, the forward-drive depression surface 4f is mounted on a front end of the plate strip, and the reverse-drive depression surface 4b is mounted on a rear end of the plate strip. Further, instead of the first auxiliary shaft 81, the second auxiliary shaft 82 may be used as a pivotal shaft for the connecting plate 43. In that case, the second auxiliary shaft 82 forms one of the fundamental components of the pedal system. Further, the first auxiliary shaft 81 and the pedal rod 46 are dispensable to allow the connecting plate 43 to be directly connected to the main shaft 8 in a fixed manner.

In the above embodiment, the neutral urging mechanism 6 is mounted adjacent to the variable speed transmission 2. Instead, the neutral urging mechanism 6 may be mounted adjacent to the pedal system. Such a neutral urging mechanism 6, for example, exerts the spring force or hydraulic pressure on the main shaft 8 as the neutral urging force.

The assembly for regulating the vehicle ground speed disclosed herein is applicable not only to tractors or lawn mowers, but also to any other agricultural vehicles such as rice transplanting machines or to construction equipment such as front-end loaders.

It will be appreciated that the configurations disclosed herein are exemplary in nature, and that these specific embodiments are not to be considered in a limiting sense because numerous variations are possible.

What is claimed is:

1. An assembly for regulating ground speed of a vehicle, wherein the vehicle comprises an engine, and a variable speed transmission having a transmission shaft changing engine power and supplying the power to driving wheels to rotate in one direction from a neutral position to move the vehicle forward and to rotate in the other direction from the neutral position to move the vehicle backward, the assembly comprising:
   a shift arm fixed to the transmission shaft;
   a main shaft extending in a vehicle transverse direction;
   a support bracket supporting the main shaft;
   a control arm connected to the main shaft;
   a shift rod transmitting pivotal movement of the control arm to the shift arm;
   a first pedal unit acting as a seesaw pedal system, and a second pedal unit acting as a dual pedal system, the first pedal unit and the second pedal unit being replaceable with each other, each pedal unit having a forward drive depression surface and a reverse drive depression surface; and
   a common lever element transmitting pivotal movement caused by the first pedal unit or the second pedal unit to the control arm,
   whereby either the first pedal unit or second pedal unit can be selected and connected to the common lever element for operation of the assembly in either a seesaw pedal mode or a dual pedal mode.

2. The assembly according to claim 1, wherein the first pedal unit and the second pedal unit each include a forward-drive depression surface and a reverse-drive depression surface spaced apart from each other in a vehicle front-rear direction.

3. The assembly according to claim 2, wherein the forward-drive depression surface and the reverse-drive depression surface of the first pedal unit are spaced apart from each other in the vehicle transverse direction, and
  wherein the forward-drive depression surface and the reverse-drive depression surface of the second pedal unit are spaced apart from each other in the vehicle transverse direction.

4. The assembly according to claim 2, wherein the first pedal unit includes
  a seesaw pedal arm unit having a front arm and a rear arm,
  a first auxiliary shaft pivotably supporting the seesaw pedal arm unit, and
  a pedal rod transmitting pivotal movement of the seesaw pedal arm unit to the common lever element, and
  wherein the forward-drive depression surface is formed at a free end of the front arm, and the reverse-drive depression surface is formed at a free end of the rear arm.

5. The assembly according to claim 2, wherein the second pedal unit includes
  a front pedal arm connected to the common lever element,
  an additional lever element rotatably supported by the main shaft,
  a rear pedal arm connected to the additional lever element, and
  a reverse linkage reversing rotation of the additional lever element to transmit the rotation to the common lever element, and
  wherein the forward-drive depression surface is formed at a free end of the front pedal arm, and the reverse-drive depression surface is formed at a free end of the rear pedal arm.

6. The assembly according to claim 5, wherein the reverse linkage includes
  a second auxiliary shaft extending parallel to the main shaft,
  a link arm rotatably supported by the second auxiliary shaft,
  a first link having one end connected to the additional lever element, and the other end connected to the link arm, and
  a second link having one end connected to the link arm, and the other end connected to the common lever element.

7. The assembly according to claim 6, wherein the second auxiliary shaft is supported by the support bracket.

8. The assembly according to claim 1, wherein the common lever element is supported by the main shaft.

* * * * *